US 9,193,334 B2

(12) United States Patent
Amano

(10) Patent No.: US 9,193,334 B2
(45) Date of Patent: Nov. 24, 2015

(54) WIPER, WIPER LEVER ASSEMBLY, AND WIPER BLADE

(71) Applicant: ASMO CO., LTD., Kosai-shi, Shizuoka-ken (JP)

(72) Inventor: Shinichirou Amano, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 210 days.

(21) Appl. No.: 13/884,902

(22) PCT Filed: Oct. 19, 2012

(86) PCT No.: PCT/JP2012/077049
§ 371 (c)(1),
(2) Date: May 10, 2013

(87) PCT Pub. No.: WO2013/080694
PCT Pub. Date: Jun. 6, 2013

(65) Prior Publication Data
US 2014/0053361 A1 Feb. 27, 2014

(30) Foreign Application Priority Data
Nov. 30, 2011 (JP) ................. 2011-262413

(51) Int. Cl.
*B60S 1/38* (2006.01)
*B60S 1/40* (2006.01)
*B60S 1/04* (2006.01)

(52) U.S. Cl.
CPC ............. *B60S 1/3801* (2013.01); *B60S 1/0491* (2013.01); *B60S 1/3806* (2013.01); *B60S 1/4064* (2013.01); *B60S 1/3849* (2013.01); *B60S 2001/3815* (2013.01)

(58) Field of Classification Search
CPC .. B60S 1/38; B60S 1/3801; B60S 2001/3813; B60S 2001/3815; B60S 1/3806

USPC ............. 15/250.43, 250.44, 250.46, 250.361, 15/250.31
See application file for complete search history.

(56) References Cited

U.S. PATENT DOCUMENTS 4,794,664 A * 1/1989 Arai ........................... 15/250.46
4,953,251 A * 9/1990 Chow ........................ 15/250.46
(Continued)

FOREIGN PATENT DOCUMENTS

DE 20 2011 100 426 9/2011
FR 2693418 * 1/1994
(Continued)

OTHER PUBLICATIONS

International Report on Patentability for International Application No. PCT/JP2012/077049 mailed Jun. 30, 2014 (9 pages).
(Continued)

*Primary Examiner* — Gary Graham
(74) *Attorney, Agent, or Firm* — Merchant & Gould P.C.

(57) ABSTRACT

A yoke lever includes an upper wall and two side walls. The upper wall includes an elongated hole, and the side wall includes a pivot coupled portion. A secondary lever includes an insertion coupling portion to be inserted and coupled to the elongated hole from the upper side. The insertion coupling portion includes an insertion tube portion having two opposing side walls, which face the inner surfaces of the side wall of the yoke lever, and two end walls, which connect the longitudinal ends of the opposing side walls. A pivot coupling portion projects from a longitudinally central portion of the opposing side wall to engage the pivot coupled portion while permitting pivoting.

13 Claims, 10 Drawing Sheets

(56) References Cited

U.S. PATENT DOCUMENTS

| | | | |
|---|---|---|---|
| 5,048,145 A * | 9/1991 | Takahashi et al. | 15/250.46 |
| 5,289,608 A | 3/1994 | Kim | |
| 5,606,766 A | 3/1997 | Lee | |
| 2009/0293218 A1 | 12/2009 | Fujiwara et al. | |
| 2010/0005609 A1 | 1/2010 | Kim | |
| 2011/0162161 A1 | 7/2011 | Amado | |
| 2012/0096666 A1 * | 4/2012 | Yoshimoto | 15/250.33 |
| 2012/0180246 A1 | 7/2012 | Ku | |

FOREIGN PATENT DOCUMENTS

| | | |
|---|---|---|
| GB | 2 139 528 | 11/1984 |
| JP | 59-213547 | 3/1984 |
| JP | 2000-203391 | 7/2000 |
| JP | 2003-127840 | 5/2003 |
| JP | 2007-55589 | 3/2007 |
| JP | 2007-055589 | 3/2007 |
| JP | 2008-168796 | 7/2008 |
| JP | 2010-18273 | 1/2010 |
| WO | WO 2007/013610 | 2/2007 |
| WO | WO 2010/035794 | 4/2010 |

OTHER PUBLICATIONS

Chinese Office Action for corresponding CN application No. 201280042658.8 mailed Aug. 31, 2015 (9 pages).

Japanese Office Action for corresponding JP Application No. 2012-098830 mailed Sep. 15, 2015 (3 pages).

* cited by examiner

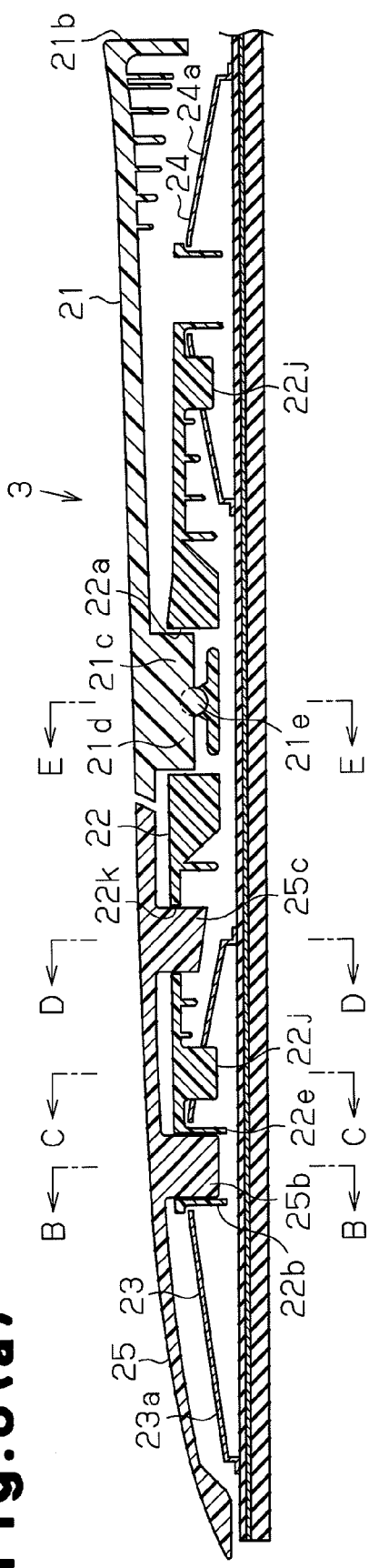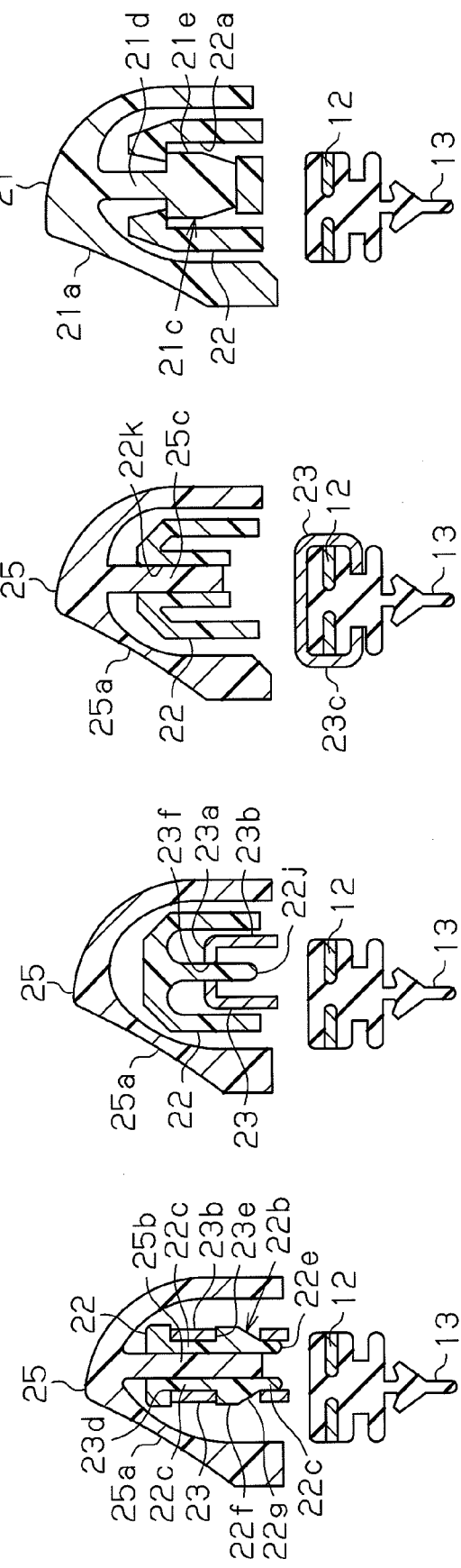

WIPER, WIPER LEVER ASSEMBLY, AND WIPER BLADE

This application is a National Stage Application of PCT/ 2012/077049, filed 19 Oct. 2012, which claims benefit of Serial No. 2011-262413, filed 30 Nov. 2011in Japan and which applications are incorporated herein by reference. To the extent appropriate, a claim of priority is made to each of the above disclosed applications.

TECHNICAL FIELD

The present invention relates to a wiper, a wiper lever assembly, and a wiper blade.

BACKGROUND ART

Conventionally, a wiper blade of a wiper includes a wiper lever assembly, which has a whippletree configuration that pivotally couples a longitudinally central part of a lower rank lever to a longitudinal end of an upper rank lever, and a backing and a wiper strip held by the wiper lever assembly.

In such a wiper lever assembly, the upper rank lever may have a reverse U-shape cross-section, and the two opens of the upper rank lever are elastically deformed and widened to sandwich and couple the lower rank lever (refer to, for example, patent document 1).

PRIOR ART DOCUMENTS

Patent Documents

Patent Document 1: Japanese Laid-Open Patent Publication No. 59-213547

SUMMARY OF THE INVENTION

However, with the wiper lever assembly (wiper blade) described above, since the two open ends of the upper rank lever are elastically deformed and greatly widened for coupling, the upper rank lever has a large dimension in the height direction. This degrades the appearance of the wiper blade, for example.

Further, pushing force from the wiper arm is transmitted from the upper rank lever to the lower rank lever through a pivot shaft that pivotally couples the levers. Thus, the upper rank lever and the lower rank lever pivot relative to each other as the pushing force acts on the pivot shaft. This easily wears the pivot shaft and adversely affects the durability.

Accordingly, it is an object of the present invention to provide a wiper, a wiper lever assembly, and a wiper blade that allows for reduction in height and improvement in appearance. A further object of the present invention is to provide a wiper having superior durability.

To achieve the above object, a wiper according to a first aspect of the present invention is a wiper configured by pivotally coupling a plurality of levers and includes a first lever and a second lever. The second lever includes a coupled end and two side walls. The coupled end extends along a longitudinal direction and includes two sides in a width direction orthogonal to the longitudinal direction. The two side walls include inner surfaces facing each other and respectively extending from the two sides toward a first side in a vertical direction. The coupled end includes a coupling portion. The coupling portion includes an elongated hole extending in the longitudinal direction as viewed from the vertical direction. Each of the side walls includes a pivot coupled portion. A first lever includes an insertion coupling portion extending toward the first side in the vertical direction. The insertion coupling portion is inserted into the elongated hole from a second side in the vertical direction and coupled to the elongated hole. The insertion coupling portion includes an insertion tube portion and a pivot coupling portion. The insertion tube portion includes two opposing side walls, respectively facing the inner surfaces, and two end walls, connecting longitudinal ends of the opposing side walls. The insertion tube portion has a substantially rectangular tube shape elongated in the longitudinal direction as viewed from the vertical direction, and the pivot coupling portion projects from a longitudinally central portion of each of the opposing side walls to pivotally engage with the corresponding pivot coupled portion.

According to such a structure, the insertion coupling portion of the first lever includes the insertion tube portion having a substantially rectangular tube shape that includes two opposing side walls, respectively facing the inner surfaces of the two side walls of the second lever, and two end walls, connecting the longitudinal ends of the opposing side walls. The insertion tube portion is elongated in the longitudinal direction (of the first lever) as viewed from the vertical direction. In the two opposing side walls of the insertion coupling portion, the longitudinally central portions are easily deformed by a large amount by its length in the longitudinal direction. This allows for insertion of the insertion coupling portion into the elongated hole of the second lever from the second side in the vertical direction while greatly deforming the longitudinally central portions of the two opposing side walls and moving the pivot coupling portion, which projects from the corresponding portion, toward the side opposite the projecting direction to engage the pivot coupling portion with the pivot coupled portion of the second lever (resolving the deformed state) and coupled the first lever and the second lever. Since the two opposing side walls of the insertion coupling portion include the longitudinally central portions (pivot coupling portion) that are easily and greatly deformed by its length in the longitudinal direction, the dimension in the height direction does not need to be increased for a large deformation and for coupling. This reduces the height of the wiper, while, for example, improving the appearance.

Furthermore, since the range facing the inner surfaces of the two side walls of the second lever is elongated in the longitudinal direction by the length in the longitudinal direction in the two opposing side walls of the insertion coupling portion (insertion tube portion), loosening in the wiping direction (width direction orthogonal to the longitudinal direction) of the second lever relative to the first lever can be reduced, for example. Moreover, even if a force in the wiping direction is applied between the first lever and the second lever, for example, the force is less likely to be applied locally on the longitudinally central portion (pivot coupling portion) of the two opposing side walls, and a case in which the second lever is separated from the first lever when the longitudinally central portion greatly deforms can be reduced.

Preferably, a thin portion formed to be thin is formed on two outer sides of the pivot coupling portion in each of the opposing side walls as viewed from the vertical direction.

According to such a structure, the thin portion formed to be thin is formed on the two outer sides of the pivot coupling portion in the two opposing side walls as viewed from the vertical direction. Thus, the corresponding portion is easily deformed with a small force, and the deformation amount (deformation margin), that is, the amount the pivot coupling portion moves to the side opposite to the projecting direction becomes large. Therefore, for example, the coupling is facilitated. For example, when the thickness of the longitudinally central portion corresponding with the pivot coupling portion in the two opposing side walls is thin, stress concentrates at the longitudinally central portion. However, the stress can be more dispersed. This obtains a configuration in which breakage is less likely to occur and deformation is facilitated.

Preferably, a deformation restriction member is fitted and inserted into the insertion tube portion of the insertion coupling portion to restrict deformation of the two opposing side walls when the insertion coupling portion is inserted and coupled to the elongated hole.

According to such a structure, the deformation restriction member for restricting the deformation of the two opposing side walls is fitted and inserted into the insertion tube portion of the insertion coupling portion when the insertion coupling portion is inserted and coupled to the elongated hole so that the pivot coupling portion is prevented from falling out of the pivot coupled portion of the lower rank lever when the two opposing side walls are deformed.

Preferably the deformation restriction member is arranged in a case attached to cover at least one of the first lever and the second lever.

According to such a structure, the deformation restriction member is arranged in the case that is attached to cover at least one of the first lever or the second lever. Thus, the number of components and the number of assembly steps are reduced compared to when the deformation restriction member is formed as a body separate from the case.

Preferably, the deformation restriction member is fitted and inserted into the insertion tube portion so that at least a part of the deformation restriction member is arranged in a vertical range corresponding to the pivot coupling portion.

According to such a structure, the deformation restriction member is fitted and inserted into the insertion tube portion so that at least a part of the deformation restriction member is arranged in a vertical range corresponding to the pivot coupling portion. Thus, the two opposing side walls at the position corresponding to the pivot coupling portion are prevented from deforming, and the pivot coupling portion is further prevented from falling out of the pivot coupled portion.

Preferably, the one among the first lever and the second lever that is an upper rank lever includes an arcuate support portion. The arcuate support portion is formed to have an arcuate shape and located above or below the pivot coupling portion. The arcuate support portion pivotally supports the one among the first lever and the second lever that is a lower rank lever, while applying pushing force from the upper rank lever to the lower rank lever.

According to such a structure, the one among the first lever and the second lever that is the upper rank lever includes an arcuate support portion, which is formed to have an arcuate shape and located above or below the pivot coupling portion, which pivotally supports the one among the first lever and the second lever that is the lower rank lever, while applying the pushing force from the upper rank lever to the lower rank lever. Thus, the lower rank lever is rigidly supported (without relying on the pivot coupling portion). Specifically, the lower rank lever constantly receives the force (pushing force) acting toward the lower side (direction of wiping surface) from the upper rank lever. However, the force does not push the pivot coupling portion and pushes the arcuate support portion formed above or below the pivot coupling portion. In other words, the pivot coupling portion and the pivot coupled portion, which function as the pivot coupling of the upper rank lever and the lower rank lever, and the arcuate support portion, which function as a portion where the pushing force from the upper rank lever acts on the lower rank lever, are configured as different portions. This ensures that coupling of the upper rank lever and the lower rank lever is maintained, while having sufficient pushing force from the upper rank lever acting on the lower rank lever. This also improves the durability at the pivot coupling portion of the upper rank lever and the lower rank lever.

Preferably, a width direction support portion is arranged in the first lever at a position where a distance from the pivot axis is farther than a longitudinal end of the opposing side wall to reduce loosening in the width direction of the second lever relative to the first lever. The width direction support portion faces in the width direction to be engagable with the second lever.

According to such a structure, the width direction support portion is arranged in the first lever at a position where the distance from the pivot axis is farther than the longitudinal end of the opposing side wall, and the width support portion faces in the width direction to be engagable with the second lever. Thus, the loosening in the width direction (wiping direction) of the second lever relative to the first lever can be further reduced. For example, even if a force in the wiping direction is applied between the first lever and the second lever, the force is less likely to be applied to the insertion coupling portion including the opposing side wall including the pivot coupling portion. This further reduces separation of the second lever from the first lever.

Preferably, one of the first lever and the second lever includes a pivot range setting projection that contacts the other one of the levers and limits a pivot range of the second lever relative to the first lever to a range set in advance.

According to such a structure, the first lever or the second lever includes the pivot range setting projection for limiting the pivot range of the second lever relative to the first lever to a range set in advance. Thus, the lower rank lever is prevented from pivoting more than necessary relative to the upper rank lever, for example. Accordingly, for example, when the lower rank lever is greatly swung when cancelling lock back (when returning the wiper strip from a position separated from the wiping surface to a position contacting the wiping surface), large impacts are suppressed when the wiper strip comes into contact with the wiping surface.

Preferably, the first lever is an upper rank lever and is made of a resin, and the second lever is a lower rank lever made of a metal and including a holding portion that holds a backing and a wiper strip.

According to such a structure, the first lever is the upper rank lever and made of resin. This facilitates molding of the insertion coupling portion, which has a complex shape, while ensuring satisfactory flexibility of the opposing side wall. Further, the weight can be reduced. The second lever, which is the lower rank lever and made of metal, includes the holding portion for holding the backing and the wiper strip. Thus, the second lever may rigidly hold the backing and the wiper strip while achieving miniaturization (thinning of holding portion).

Preferably, the case includes a fin portion that converts travel wind when a vehicle is travelling to a pushing force acting toward a wiping surface According to such a structure, when the vehicle is travelling, the travel wind is converted to the pushing force toward the wiping surface side by the fin portion, and the wiper strip is pushed against the wiping surface. Thus, a satisfactory wiping operation is performed.

Preferably, a dimension from an upper edge of the insertion coupling portion to the pivot coupling portion is smaller than a dimension from the end wall of the insertion tube portion to the pivot coupling portion.

According to such a structure, a dimension h from the upper edge of the insertion coupling portion to the pivot coupling portion that affects the dimension in the height direction of the wiper is smaller than a dimension w from the end wall in the insertion tube portion to the pivot coupling portion that affects the dimension in the longitudinal direction of the wiper. Thus, even if the dimension w is increased to easily deform the longitudinally central portion of the two opposing side walls during coupling, the height dimension of the wiper is prevented from being increased.

To achieve the above object, second aspect of the present invention is a wiper lever assembly configured by pivotally coupling a plurality of levers and includes a first lever and a second lever. The second lever includes a coupled end and two side walls. The coupled end extends along a longitudinal direction and includes two sides in a width direction orthogonal to the longitudinal direction. The two side walls include inner surfaces facing each other and respectively extending from the two sides toward a first side in a vertical direction. The coupled end includes a coupling portion. The coupling portion includes an elongated hole extending in the longitudinal direction as viewed from the vertical direction. Each of the side walls includes a pivot coupled portion. A first lever includes an insertion coupling portion extending toward the first side in the vertical direction. The insertion coupling portion is inserted into the elongated hole from a second side in the vertical direction and coupled to the elongated hole. The insertion coupling portion includes an insertion tube portion and a pivot coupling portion. The insertion tube portion includes two opposing side walls, respectively facing the inner surfaces, and two end walls, connecting longitudinal ends of the opposing side walls. The insertion tube portion has a substantially rectangular tube shape elongated in the longitudinal direction as viewed from the vertical direction. The pivot coupling portion projects from a longitudinally central portion of each of the opposing side walls to pivotally engage with the corresponding pivot coupled portion.

According to such a structure, the wiper lever assembly obtains the same advantages as the first aspect.

Preferably, a wiper blade including the wiper lever assembly according to the second aspect, and a backing and a wiper strip held by the wiper lever assembly is provided.

According to such a structure, the wiper blade obtains the same advantages as the second aspect.

To achieve the above object, a wiper according to a third aspect of the present invention is configured by pivotally coupling a plurality of levers and includes a first lever and a second lever. The second lever includes a coupled end and two side walls. The coupled end extends along a longitudinal direction and includes two sides in a width direction orthogonal to the longitudinal direction. The two side walls include inner surfaces facing each other and respectively extending from the two sides toward a first side in a vertical direction. The coupled end includes a coupling portion. The coupling portion includes an elongated hole extending in the longitudinal direction as viewed from the vertical direction, and each of the side walls includes a pivot coupled portion. A first lever includes an insertion coupling portion extending toward the first side in the vertical direction. The insertion coupling portion is inserted into the elongated hole from a second side in the vertical direction and coupled to the elongated hole. The first lever includes a pivot coupling portion that pivotally engages the pivot coupled portion of the second lever. The one among the first lever and the second lever that is an upper rank lever includes an arcuate support portion. The arcuate support portion pivotally supports the one among the first lever and the second lever that is a lower rank lever, while applying pushing force from the upper rank lever to the lower rank lever.

According to such a structure, the one among the first lever and the second lever that is the upper rank lever includes an arcuate support portion, which is formed to have an arcuate shape above or below the pivot coupling portion and which pivotally supports the lower rank lever of the first lever and the second lever while applying the pushing force from the upper rank lever to the lower rank lever. Thus, the lower rank lever is rigidly supported (without relying on the pivot coupling portion). Specifically, the lower rank lever constantly receives force (pushing force) acting toward the lower side (direction of wiping surface) from the upper rank lever, but such force may not be pushed with the pivot coupling portion, and may be pushed with the arcuate support portion formed on the upper side or the lower side of the pivot coupling portion. In other words, the pivot coupling portion and the pivot coupled portion, which function as the pivot coupling of the upper rank lever and the lower rank lever, and the arcuate support portion, which function as a portion where the pushing force from the upper rank lever acts on the lower rank lever, are configured as different portions. This ensures that coupling of the upper rank lever and the lower rank lever is maintained, while having sufficient pushing force from the upper rank lever acting on the lower rank lever. This also improves the durability at the pivot coupling portion of the upper rank lever and the lower rank lever.

Effect of the Invention

The present invention provides a wiper, a wiper lever assembly, and a wiper blade that allows for reduction in height and improvement in appearance. Further, the present invention provides a wiper having superior durability.

BRIEF DESCRIPTION OF THE DRAWINGS

FIG. 3(a) is a partial cross-sectional view of the wiper blade according to the present embodiment, FIG. 3(b) is a cross-sectional view taken along line B-B in FIG. 3(a), FIG. 3(c) is a cross-sectional view taken along line C-C in FIG. 3(a), FIG. 3(d) is a cross-sectional view taken along line D-D in FIG. 3(A), and FIG. 3(e) is a cross-sectional view taken along line E-E in FIG. 3(a).

DETAILED DESCRPTION OF THE PREFERRED EMBODIMENTS

One embodiment of the present invention will now be described with reference to FIGS. 1 to 5.

Figure 1:
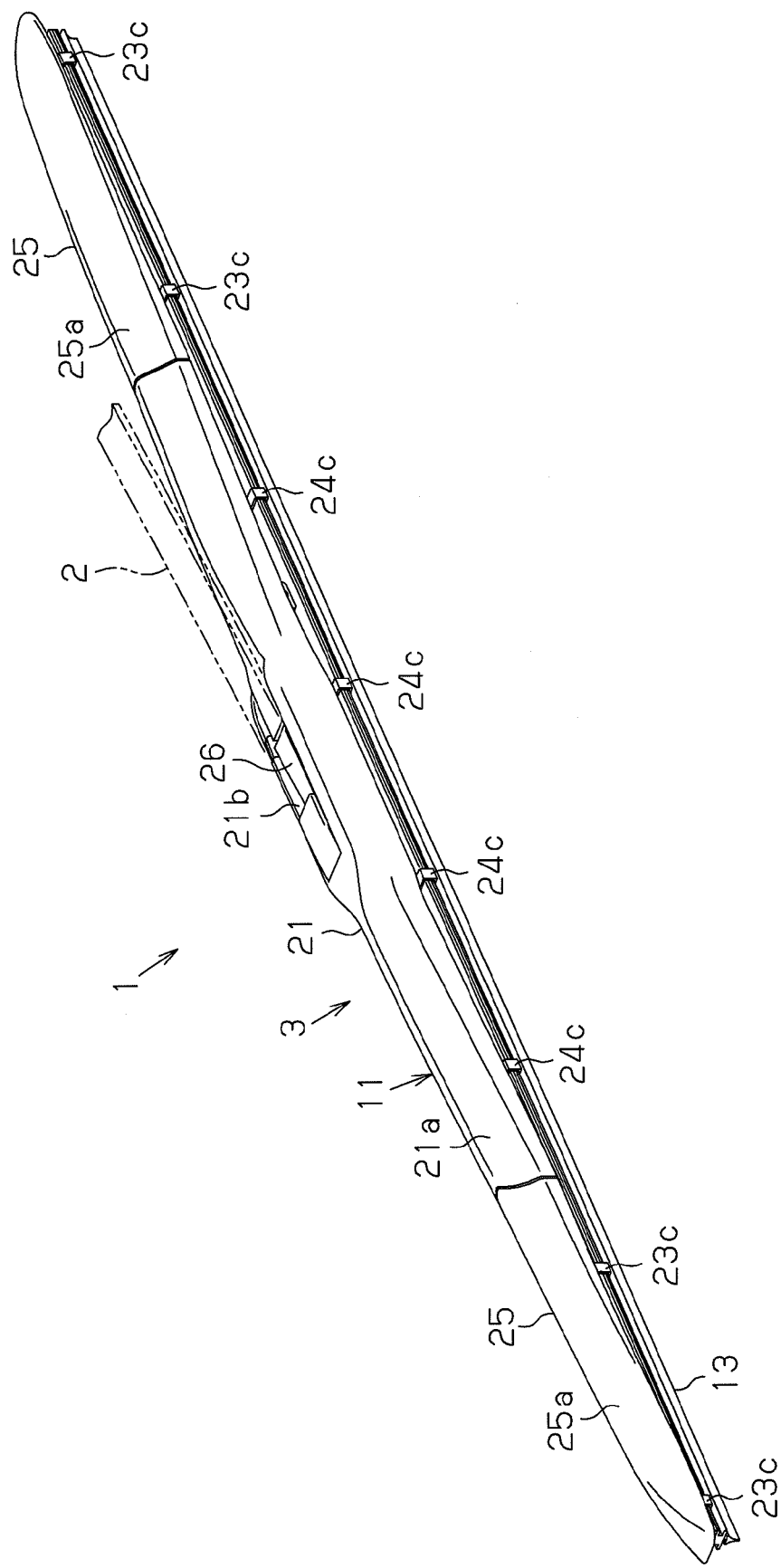
FIG. 1 is a perspective view of a wiper for a vehicle according to the present embodiment.

Referring to FIG. 1, a wiper 1 for a vehicle wipes off rain and the like from a windshield serving as a wiping surface of an automobile, and includes a wiper arm 2 and a wiper blade 3, which is coupled to the wiper arm 2. The wiper arm 2 includes a basal end fixed to a pivot shaft (not shown) that pivots in a reciprocating manner within a predetermined angle by the drive force of a wiper motor (not shown). The reciprocating pivoting movement of the pivot shaft produces a reciprocating swinging movement of the wiper arm 2. The wiper arm 2 has a distal end urged toward the windshield (wiping surface) by an urging mechanism (not shown). The wiper blade 3 is coupled to the distal end of the wiper arm 2.

The wiper blade 3 includes a wiper lever assembly 11, and a backing 12 (refer to, for example, FIG. 3(d)) and a wiper strip 13 held by the wiper lever assembly 11.

The wiper lever assembly 11 has a whippletree configuration that pivotally couples a longitudinally central part of a lower rank lever to a longitudinal end of an upper rank lever, and a backing and a wiper strip held by the wiper lever assembly.

Figure 2:
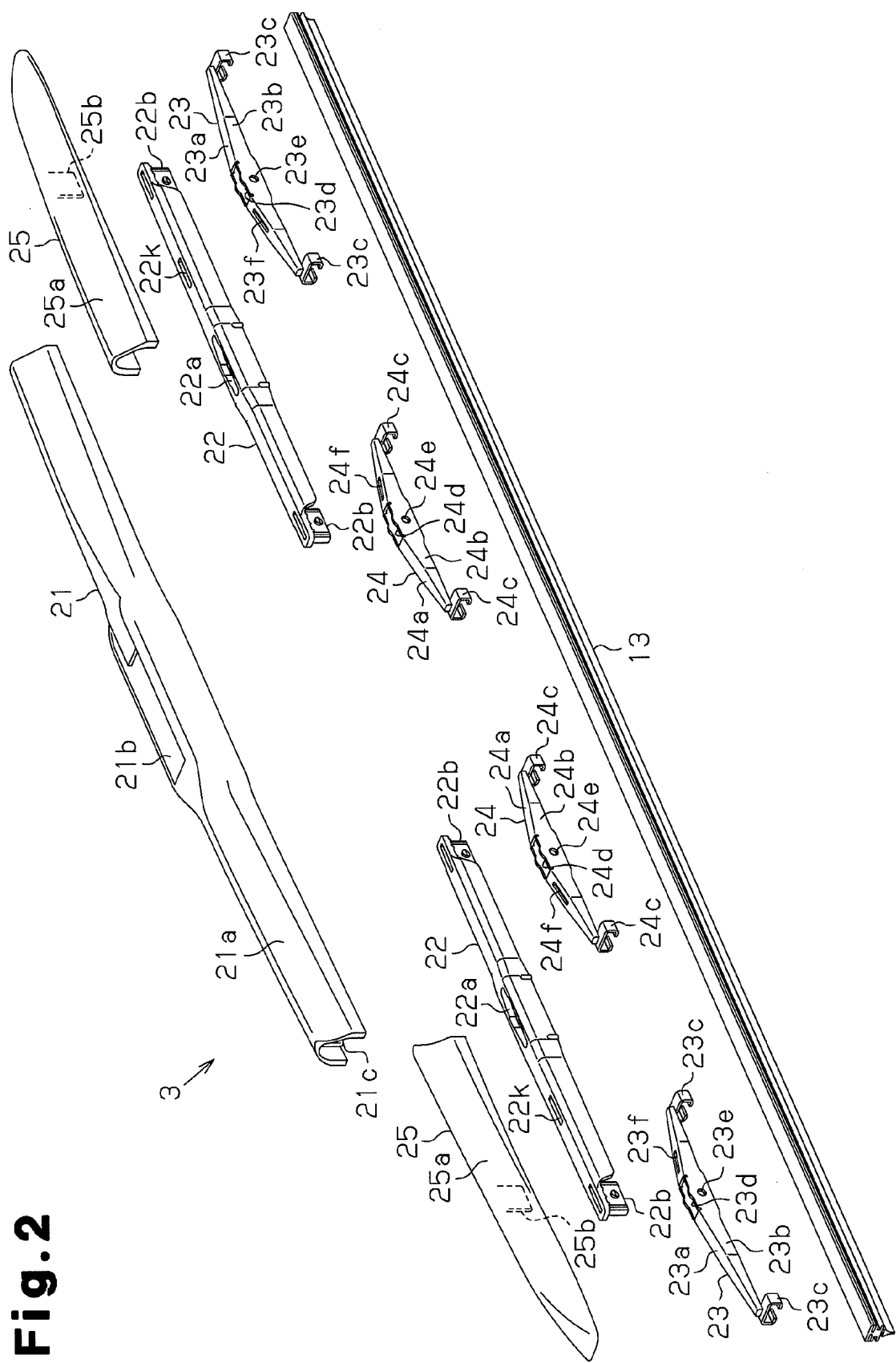
FIG. 2 is a partially exploded perspective view of a wiper blade according to the present embodiment.

Specifically, as shown in FIG. 2, the wiper lever assembly 11 of the present embodiment includes a center cover lever 21 serving as a lever, two secondary levers 22 serving as a first lever, and four yoke levers 23 and 24 serving as a second lever. The wiper lever assembly 11 further includes two cases 25.

The center cover lever 21 is made of resin and has a generally reverse U-shape cross-section orthogonal to a longitudinal direction. The generally entire surface of the center cover lever 21 (excluding central portion) extending longitudinally and facing a front side of the vehicle defines a top portion 21a that converts travel wind to a pushing force acting toward the wiping surface (see FIG. 2 and FIG. 3(e)). A clip coupling hole 21b is formed in the longitudinally central portion of the center cover lever 21, and a clip 26, to which the distal end of the wiper arm 2 is attached in a removable manner, is arranged in the clip coupling hole 21b so as to be pivotal about n axis extending in a width direction. A center coupling portion 21c (see FIGS. 3(a), 3(e)) is formed at each of the two longitudinal ends of the center cover lever 21. As shown in FIGS. 3(a) and 3(e), the center coupling portion 21c of the present embodiment includes a plate-like portion 21d, downwardly projecting from an upper portion in the center cover lever 21, and a center shaft portion 21e, projecting in a width direction from a lower end at the longitudinally central portion of the plate-like portion 21d. The longitudinally central portion of the secondary lever 22 is pivotally coupled to the two longitudinal ends (center coupling portion 21c) of the center cover lever 21.

The secondary lever 22 is made of resin and has a substantially reverse U-shape cross-section orthogonal to the longitudinal direction (see FIG. 3(c)). As shown in FIGS. 2, 3(a), and 3(e), a coupling groove 22a is formed in the longitudinally central portion of the secondary lever 22. When the center coupling portion 21c is fitted into the coupling groove 22a, the secondary lever 22 is coupled to the center cover lever 21 pivotally about the center shaft portion 21e.

The longitudinally central portions of the yoke levers 23 and 24 are pivotally coupled to two longitudinal ends of the secondary lever 22.

Specifically, the yoke levers 23 and 24 are made of metal and have a substantially reverse U-shape cross-section orthogonal to a longitudinal direction. Further, the yoke levers 23 and 24 respectively include upper walls 23a and 24a serving as coupled ends, and two side walls 23b and 24b that downwardly extend from the two sides in the width direction orthogonal to the longitudinal direction of the upper wall 23a, 24a, as shown in FIGS. 2 to 5. The yoke levers 23 and 24 respectively include holding portions 23c and 24c with two longitudinal ends that hold the backing 12 and the wiper strip 13. Elongated holes 23d and 24d, which are elongated in the longitudinal direction of the yoke levers 23 and 24 as viewed from the vertical direction, are formed in the longitudinally central portions of the upper wall 23a and 24a, respectively. The elongated holes 23d and 24d have the same width as the upper walls 23a and 24a, and divide the upper walls 23a and 24a into two in the longitudinal direction. Pivot coupling holes 23e and 24e serving as pivot coupled portions are formed in the longitudinally central portion of the side walls 23b and 24b. Support holes 23f and 24f, which are elongated in the longitudinal direction as viewed from the vertical direction, are formed at the inner sides (side to be covered by the secondary levers 22) of the longitudinally central portions (elongated hole 23d, 24d) of the upper walls 23a and 24a.

Figure 4:
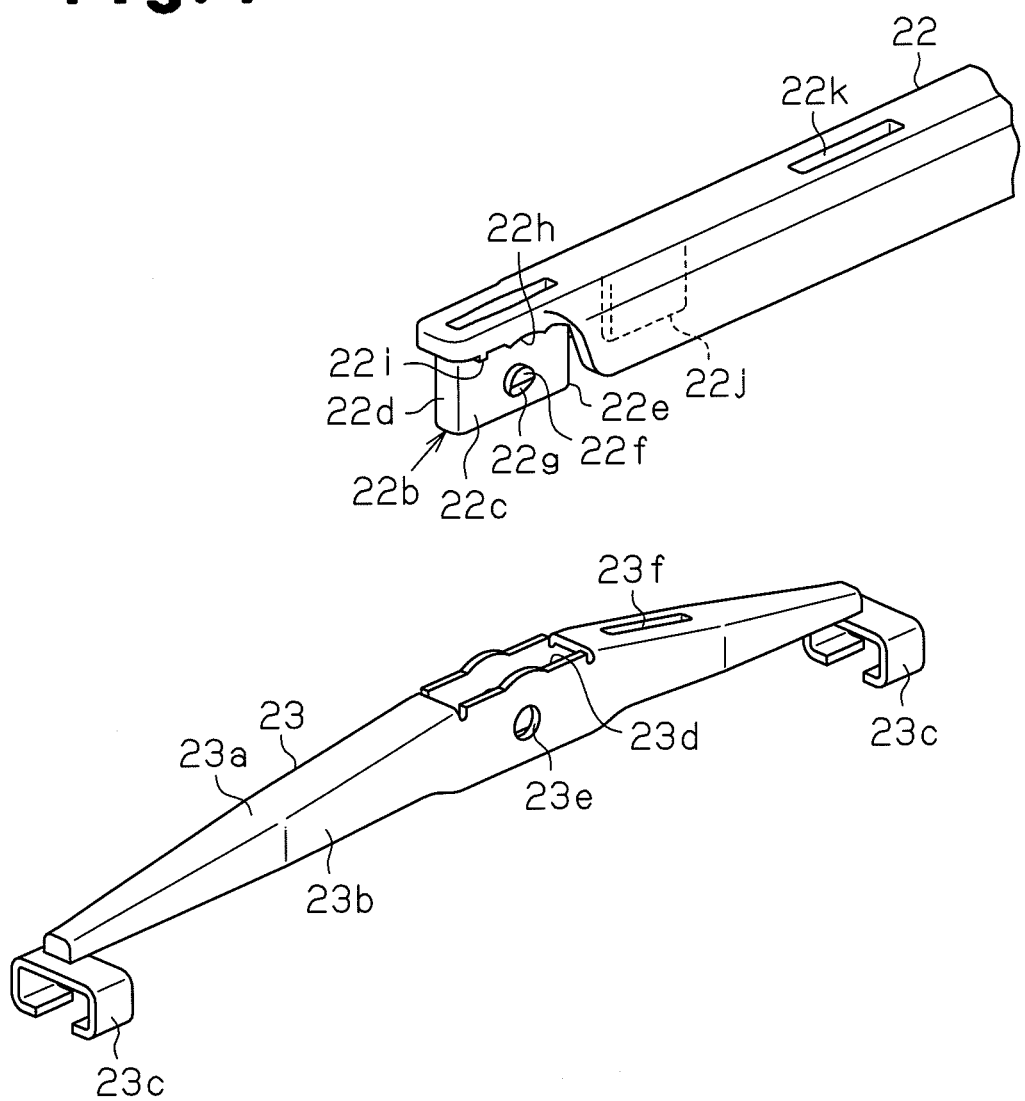
FIG. 4 is a partially exploded enlarged view of a wiper lever assembly according to the present embodiment.

As shown in FIG. 4, the two longitudinal ends of the secondary lever 22, at which only the upper wall extends from the substantially reverse U-shaped portion, and includes insertion coupling portions 22b that downwardly extended from the upper wall for insertion and coupling to the elongated holes 23d and 24d from the upper side.

Figure 5A:
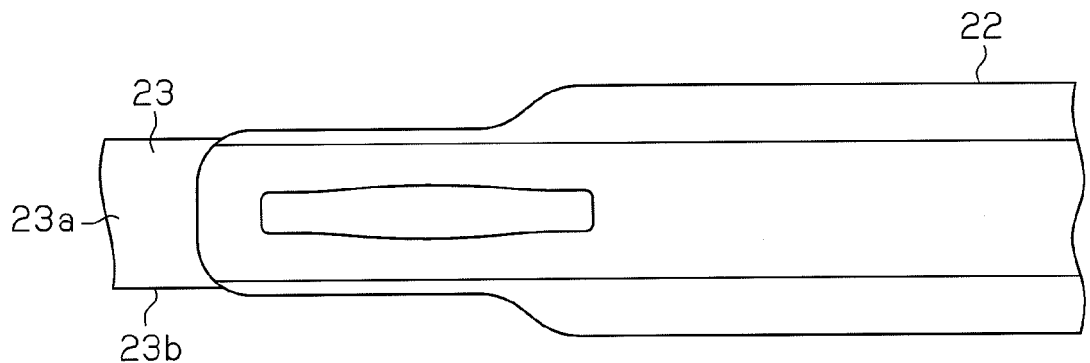
FIG. 5(a) is a partially enlarged plan view of the wiper lever assembly according to the present embodiment.
Figure 5B:
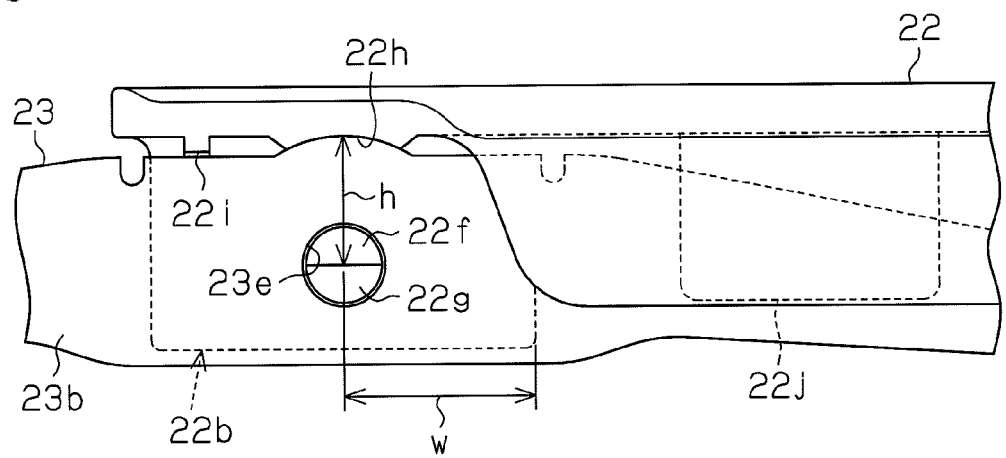
FIG. 5(b) is a partially enlarged side view of the wiper lever assembly of FIG. 5(a)
Figure 5C:
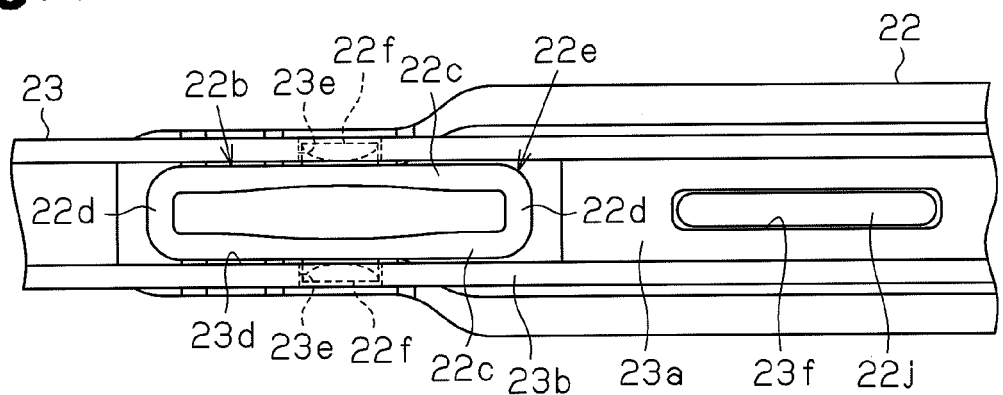
FIG. 5(c) is a partially enlarged bottom view of the wiper lever assembly of FIG. 5(a).

As shown in FIGS. 4 and 5(c), the insertion coupling portion 22b includes an insertion tube portion 22e, which has two parallel opposing side walls 22c that face the inner surfaces of the two of side walls 23b (24b), and two end walls 22d, which connect the longitudinal ends of the opposing side walls 22c. The insertion tube portion 22e has a substantially rectangular tube shape elongated in the longitudinal direction as viewed from the vertical direction (lower side) (see FIG. 5(c)). As shown in FIGS. 4 and 5, the insertion coupling portion 22b includes a pivot coupling shaft portion 22f serving as a pivot coupling portion that projects in the width direction from the longitudinally central portion of each of the two opposing side walls 22c. The pivot coupling shaft portion 22f engages the pivot coupling hole 23e (24e) and cooperatively operates with the pivot coupling hole 23e (24e) to permit pivoting while preventing separation of the yoke lever 23 (24) from the secondary lever 22. The pivot coupling shaft portion 22f of the present embodiment is formed to have a circular shape as viewed from the axial direction, and includes a lower half forming an inclined surface 22g that is inclined so that the projecting amount becomes smaller toward the lower side. As shown in FIG. 5(b), the pivot coupling shaft portion 22f is arranged at a position where dimension h from the upper edge of the insertion coupling portion 22b is smaller than dimension w from the end wall 22d in the insertion tube portion 22e. The pivot coupling shaft portion 22f has a circular shape as viewed from the axial direction, but may have other shapes, for example, an elliptical or an oval shape as long as the pivot coupling shaft portion 22f may cooperatively operate with the pivot coupling hole 23e (24e) to permit pivoting while preventing separation of the yoke lever 23 (24) from the secondary lever 22.

AS shown in FIG. 5(b), the secondary lever (extended upper wall) includes an arcuate support portion 22h having an arcuate shape, specifically, an arcuate recess shape substantially concentric with the pivot coupling shaft portion 22f and located at the upper side of the pivot coupling shaft portion 22f. The arcuate support portion 22h contacts the upper edges of the two side walls 23b (24b) at positions corresponding to the elongated holes 23d (24d) of the yoke levers 23 (24) to pivotally support the yoke levers 23 (24) while applying pushing force from the secondary lever 22 to the yoke lever 23 (24).

As shown in FIG. 5(c), the longitudinally central portions of the two opposing side walls 22c are thinner than the longitudinal ends. In the present embodiment, the thickness is set so that the two opposing side walls 22c deform at the longitudinally central portions in the longitudinal direction and the pivot coupling shaft portion 22f is movable toward the side opposite to the projecting direction by its projecting amount or greater. In other words, the thickness of the longitudinally central portion is set so that the distance between the longitudinally central portions of the two opposing side walls 22c is greater than or equal to twice the projecting amount of the pivot coupling shaft portion 22f. The insertion coupling portion 22b is inserted and coupled to the elongated holes 23d and 24d from the upper side so that the secondary lever 22 and the yoke levers 23 and 24 are relatively pivotal. In other words, when the insertion coupling portion 22b is inserted into the elongated holes 23d and 24d from the upper side, the longitudinally central portion of the two opposing side walls 22c deform (toward each other) as the insertion of the inclined surface 22g advances, and eventually, the pivot coupling shaft portion 22f is fitted into the pivot coupling holes 23e and 24e (the deformed state is cancelled) thereby allowing for the coupling (coupling of the secondary lever 22 and the yoke levers 23 and 24).

When the arcuate support portion 22h of the secondary lever 22 is in contact with the upper edge of the two side walls 23b (24b) of the yoke lever 23 (24), the pivot coupling shaft portion 22f has a shape that avoids contact with the lower part of the pivot coupling hole 23e (24e) of the yoke lever 23 (24) (shape having a surface that subtly comes into contact and making it difficult for the pushing force to be transmitted to the lower side), and the pushing force from the secondary lever 22 is mainly applied from the arcuate support portion 22h but subtly applied from the pivot coupling shaft portion 22f.

As shown in FIG. 5(b), the secondary lever 22 (extended upper wall) includes a pivot range setting projection 22i that sets the pivot range of the yoke lever 23 (24) relative to the secondary lever 22 to a preset range. The pivot range setting projection 22i of the present embodiment sets the pivot range toward the outer side (clockwise direction in FIG. 5(b)) of the yoke lever 23 (24) relative to the secondary lever 22 so that the backing 12 and the wiper strip 13 held by the holding portions 23c, 24c are in a straight line (so that the pivot range setting projection 22i contacts the yoke lever 23 (24)).

As shown in FIGS. 3(c) and 5(c), the secondary lever 22 includes a support wall 22j serving as a width direction support portion that is inserted into the support hole 23f (24f) of the yoke lever 23, 24 to face (contact) the yoke lever 23 (24) in the width direction and thus suppressing loosening of the yoke lever 23 (24) from the secondary lever 22 in the width direction. Each dimension of the support wall 22j is set so that the pivoting of the yoke lever 23 (24) relative to the secondary lever 22 is permitted even when inserted into the support hole 23f (24f).

As shown in FIGS. 1, 3(a), 3(c), and 3(d), the cases 25 that covers the portion projecting from the center cover lever 21 of the secondary lever 22 is attached to the secondary levers 22. The case 25 is made of resin and has a substantially reverse U-shape cross-section orthogonal to the longitudinal direction. The generally entire surface of the case 25 extending longitudinally and facing the front side of the vehicle defines a fin portion 25a that converts travel wind to a pushing force acting toward the wiping surface (see FIGS. 3(b) to 3(e)). The fin portion 25a is formed as a surface that is substantially continuous with the fin portion 21a of the center cover lever 21. The case 25 of the present embodiment also covers the portions of the yoke levers 23 projecting out of the secondary lever 22.

As shown in FIGS. 3(a) and 3(b), a deformation restriction plate-like portion 25b is formed in the case 25 to serve as a deformation restriction member and a deformation restriction portion that can be fitted and inserted into the insertion coupling portion 22b (insertion tube portion 22e). As shown in FIGS. 3(a) and 3(d), a fitting plate-like portion 25c formed in the case 25 may be fitted and inserted to a fitting hole 22k formed in the upper wall of the secondary lever 22. As shown in FIGS. 3(a), 3(b), and 3(d), the case 25 is attached to the secondary lever 22 by fitting and inserting the deformation restriction plate-like portion 25b into the insertion coupling portion 22b (insertion tube portion 22e) and fitting and inserting the fitting plate-like portion 25c to the fitting hole 22k. As shown in FIG. 3(b), the deformation restriction plate-like portion 25b of the present embodiment is fitted and inserted into the insertion coupling portion 22b (insertion tube portion 22e) so that the distal end is arranged in a vertical range of the pivot coupling shaft portion 22f, that is, the vertical range of the pivot coupling hole 23e. Further, in the present embodiment, the deformation restriction plate-like portion 25b is fitted and inserted to the insertion coupling portion 22b (insertion tube portion 22e) so as to be arranged throughout the vertical range of the pivot coupling shaft portion 22f. When the deformation restriction plate-like portion 25b is fitted and inserted into the insertion coupling portion 22b (insertion tube portion 22e), deformation of the two opposing side walls 22c, that is, movement of the pivot coupling shaft portion 22f is restricted, as shown in FIG. 3(b).

The operation of the vehicle wiper 1 will now be described.

In the vehicle wiper 1, the distal end of the wiper arm 2 is urged toward the windshield (wiping surface) by a urging mechanism (not shown), which transmits urging force to the wiper strip 13 through the clip 26, the center cover lever 21, the secondary levers 22, and the yoke levers 23, 24. This pushes the wiper strip 13 against the windshield over the entire length in the longitudinal direction. As the vehicle travels, the fin portions 21a and 25a convert travel wind to pushing force acting toward the windshield (wiping surface). This pushes the wiper strip 13 against the windshield. Therefore, when the wiper arm 2 is pivoted in a reciprocating manner around the pivot shaft, a satisfactory wiping operation is performed.

The above embodiment has the advantages described below.

(1) The insertion coupling portion 22b of the secondary lever 22 includes the insertion tube portion 22e that includes the two opposing side walls 22c respectively facing the inner surfaces of the two side walls 23b, 24b of the yoke levers 23, 24 and the two end walls 22d connecting the longitudinal ends of the opposing side walls 22c. The insertion tube portion 22e has a substantially rectangular tube shape that is elongated in the longitudinal direction (of the secondary lever 22) as viewed from the vertical direction (lower side). In the two opposing side walls 22c of the insertion coupling portion 22b, the longitudinally central portion is easily deformed for a large amount by its length in the longitudinal direction. Thus, the insertion coupling portion 22b may be inserted into the elongated holes 23d, 24d of the yoke levers 23, 24 from the upper side while greatly deforming the longitudinally central portions of the two opposing side walls 22c and moving the pivot coupling shaft portion 22f toward the side opposite to the projecting direction. The secondary lever 22 and the yoke levers 23, 24 are coupled by engaging the pivot coupling shaft portion 22f with the pivot coupling holes 23e, 24e of the yoke levers 23, 24 (cancelling the deformed state). The two opposing side walls 22c of the insertion coupling portion 22b easily obtain a length in the longitudinal direction (without increasing the height. Thus, the longitudinally central portions of the side walls 22c (pivot coupling shaft portions 22f) obtains sufficient deformation amounts, and the dimension in the height direction does not need to be increased for large deformations during coupling. As a result, for example, the appearance can be improved while reducing the height of the wiper lever assembly 11 and the wiper blade 3.

Furthermore, in the two opposing side walls 22c of the insertion coupling portion 22b (insertion tube portion 22e), the range facing the inner surfaces of the two side walls 23b, 24b of the yoke levers 23, 24 is elongated in the longitudinal direction by the length in the longitudinal direction. Therefore, for example, loosening in the wiping direction (width direction orthogonal to the longitudinal direction) of the yoke levers 23, 24 relative to the secondary lever 22 can be reduced. Furthermore, for example, force is less likely to be applied locally on the longitudinally central portion (pivot coupling shaft portion 22f) of the two opposing side walls 22c even if the force in the wiping direction is applied between the secondary lever 22 and the yoke levers 23, 24. This prevents the large deformation of the longitudinally central portion that separates the yoke levers 23, 24 from the secondary levers 22.

(2) The longitudinally central portion of the two opposing side walls 22c is formed thinner than the end side in the longitudinal direction, and thus easily deformed with a small force. Further, the deformation amount (deformation margin), that is, the amount the pivot coupling shaft portion 22f moves to the side opposite to the projecting direction becomes large. Therefore, for example, the coupling is facilitated. The longitudinal ends of the two opposing side walls 22c is thicker than the longitudinally central portion, and thus the rigidity of the entire insertion coupling portion 22b (insertion tube portion 22e) is kept high, while obtaining the above-described advantages.

(3) The deformation restriction plate-like portion 25b that restricts deformation of the two opposing side walls 22c is fitted and inserted into the insertion tube portion 22e of the insertion coupling portion 22b in a state in which the insertion coupling portion 22b inserted and coupled to the elongated hole 23d. Thus, the pivot coupling shaft portion 22f is prevented from falling out of the pivot coupling hole 23e when the two opposing side walls 22c are deformed. This prevents separation of the yoke lever 23 from the secondary lever 22.

(4) The deformation restriction member for restricting the deformation of the two opposing side walls 22c being fitted and inserted into the insertion tube portion 22e is the deformation restriction plate-like portion 25b (deformation restriction portion) arranged in the case 25 attached to cover the secondary lever 22. Thus, the number of components and the number of coupling steps are reduced compared to when the deformation restriction member is formed as a member separated from the case 25.

(5) The deformation restriction plate-like portion 25b is fitted and inserted into the insertion tube portion 22e so that the distal end is arranged in a vertical range corresponding to the pivot coupling shaft portion 22f. This prevents deformation of the two opposing side walls 22c at the position corresponding to the pivot coupling shaft portion 22f, and the pivot coupling shaft portion 22f is further prevented from falling out of the pivot coupling hole 23e.

(6) The secondary lever 22 includes the arcuate support portion 22h, which is formed to have an arcuate recess shape substantially concentric with the pivot coupling shaft portion 22f on the upper side of the pivot coupling shaft portion 22f and which pivotally supports the yoke levers 23, 24 while applying the pushing force from the secondary lever 22 to the yoke levers 23, 24. This rigidly supports the yoke levers 23, 24 (without relying on the pivot coupling shaft portion 22f). Specifically, in the yoke levers 23 and 24, the pivot coupling shaft portions 22f and the pivot coupling holes 23e are formed separately from the arcuate support portion 22h. The pivot coupling shaft portions 22f and the pivot coupling holes 23e function as a pivot coupling of the secondary lever 22 and the yoke levers 23 and 24 in which the yoke levers 23 and 24 constantly receive downward (wiping direction) force (pushing force) from the secondary lever 22. The force does not push the pivot coupling shaft portion 22f and pushes the arcuate support portion 22h formed above the pivot coupling shaft portion 22f. The arcuate support portion 22h functions as a portion where the pushing force from the secondary lever 22 acts on the yoke levers 23 and 24. Accordingly, the coupling of the secondary levers 22 and the yoke levers 23 and 24 are maintained and ensured while sufficient pushing force from the secondary levers 22 act on the yoke levers 23 and 24. The durability at the pivot coupling portion (pivot coupling shaft portion 22f and pivot coupling hole 23e) of the secondary lever 22 and the yoke levers 23, 24 is also enhanced. If the assembly performance is enhanced with the lower half of the pivot coupling shaft portion 22f formed as the inclined surface 22g as in the present embodiment, the configuration in which the force (pushing force) is not applied (added) to the pivot coupling shaft portion 22f is inevitably obtained. However, the force can be applied (added) with the arcuate support portion 22h. This allows for rigid supporting while improving the coupling performance.

(7) The secondary lever 22 includes the support wall 22j for preventing loosening in the width direction of the yoke levers 23, 24 relative to the secondary lever 22 facing, in the width direction, the yoke levers 23, 24 (inner surfaces of the support holes 23f, 24f) at the position where the distance from the center of the pivot shaft (pivot coupling shaft portion 22f) is farther than the longitudinal ends of the opposing side wall 22c. Therefore, the loosening in the width direction (wiping direction) of the yoke levers 23, 24 relative to the secondary lever 22 is reduced. For example, even if a force in the width direction (wiping direction) is applied between the secondary lever 22 and the yoke levers 23, 24, the force is less likely to be applied to the insertion coupling portion 22b including the opposing side wall 22c with the pivot coupling shaft portion 22f. This suppresses separation of the yoke levers 23, 24 from the secondary lever 22.

(8) The secondary lever 22 includes the pivot range setting projection 22i for limiting the pivot range of the yoke levers 23, 24 relative to the secondary lever 22 to a range set in advance by contacting the yoke levers 23, 24, and thus the yoke levers 23, 24 are prevented from pivoting more than necessary relative to the secondary lever 22. Therefore, for example, when the yoke levers 23, 24 are greatly swung when cancelling lock back (when returning the wiper strip 13 from a position separated from the wiping surface to a position contacting the wiping surface), large impacts are suppressed when the wiper strip 13 comes into contact with the wiping surface.

(9) The secondary lever 22 is made of resin, so that the insertion coupling portion 22b, which may have a complex shape, is easily molded while ensuring satisfactory flexibility of the opposing side wall 22c, and the weight is reduced. The yoke levers 23, 24 are made of metal including the holding portions 23c, 24c for holding the backing 12 and the wiper strip 13, and thus rigidly hold the backing 12 and the wiper strip 13 while achieving miniaturization (reduction in thickness of holding portions 23c, 24c).

(10) As shown in FIG. 5(b), the pivot coupling shaft portion 22f is arranged at a position where the dimension h from the upper edge of the insertion coupling portion 22b becomes smaller than the dimension w from the end wall 22d in the insertion tube portion 22e. In other words, the dimension h from the upper edge of the insertion coupling portion 22b to the pivot coupling shaft portion 22f that affects the dimension in the height direction of the wiper 1 is smaller than the dimension w from the end wall 22d in the insertion tube portion 22e to the pivot coupling shaft portion 22f that affects the dimension in the longitudinal direction of the wiper 1. Thus, even if the dimension w is increased to facilitate deformation of the longitudinally central portion of the two opposing side walls 22c during coupling, the height dimension of the wiper 1 is prevented from becoming high.

The above embodiment may be modified as described below.

In the above embodiment, the support holes 23f, 24f are formed in the yoke levers 23, 24, and the support wall 22j serving as the width direction support portion is formed in the secondary lever 22. However, the structure of the width direction support portion may be changed. In other words, the secondary lever 22 may be formed with other width direction support portions for reducing loosening in the width direction of the yoke levers 23, 24 relative to the secondary lever 22 facing, in the width direction, the yoke levers 23, 24 at the position where the distance from the center of the pivot shaft (pivot coupling shaft portion 22f) of the yoke levers 23, 24 is farther than the longitudinal ends of the opposing side walls 22c.

Figure 6A:
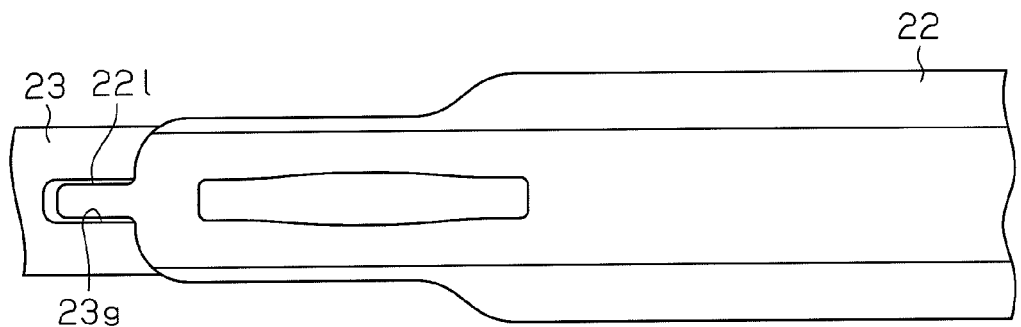
FIG. 6(a) is a partially enlarged plan view of a wiper lever assembly according to another example.
Figure 6B:
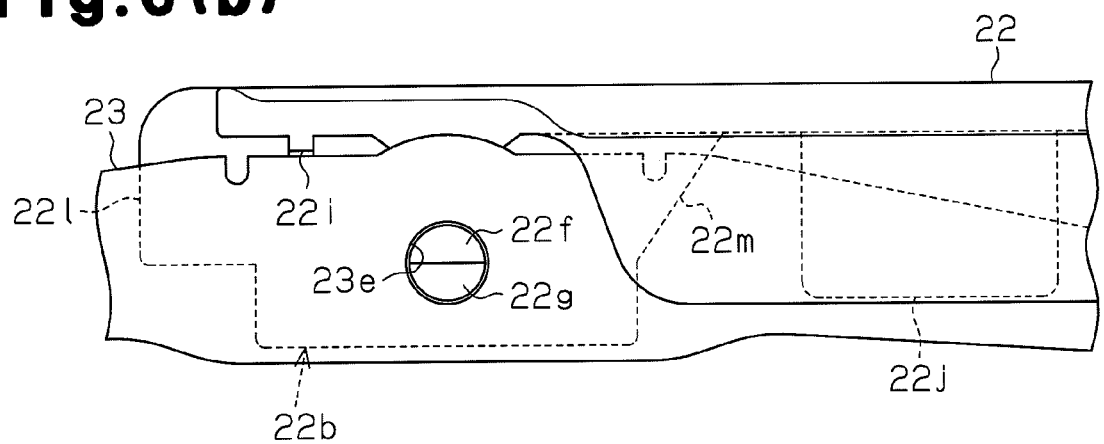
FIG. 6(b) is a partially enlarged side view of the wiper lever assembly of FIG. 6(a)
Figure 6C:
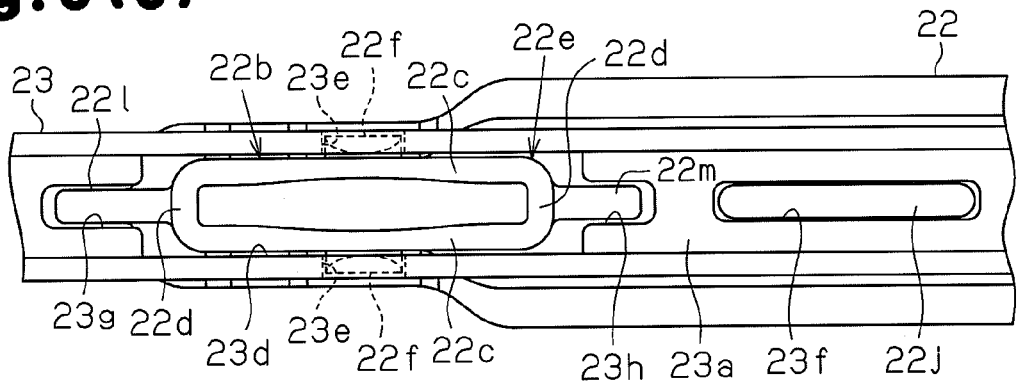
FIG. 6(c) is a partially enlarged bottom view of the wiper lever assembly of FIG. 6(a).

For example, changes may be made as shown in FIGS. 6(a) to 6(c). First, the upper wall 23a of the yoke lever 23 (24) in this example includes thin holes 23g, 23h having a narrower width than the elongated hole 23d and extending further in the longitudinal direction from the longitudinal ends of the elongated hole 23d, as shown in FIG. 6(c). In this example, the two thin holes 23g, 23h respectively extend from two longitudinal ends of the elongated hole 23d. The longitudinal end of the secondary lever 22 includes a distal end support wall 22l serving as the width direction support portion for reducing loosening in the width direction of the yoke lever 23 (24) relative to the secondary lever 22 by being inserted into the thin hole 23g to face (contact), in the width direction, the yoke lever 23 (inner surface of thin hole 23g). In this manner, the loosening in the width direction (wiping direction) of the yoke lever 23 (24) relative to the secondary lever 22 is further reduced by the support wall 22j and the distal end support wall 22l formed at the two longitudinal sides of the insertion coupling portion 22b. For example, even if a force in the width direction (wiping direction) is applied between the secondary lever 22 and the yoke lever 23 (24), force is less likely to be applied to the insertion coupling portion 22b including the opposing side wall 22c including the pivot coupling shaft portion 22f, and separation of the yoke lever 23 (24) from the secondary lever 22 is further reduced. As shown in FIGS. 6(b) and 6(c), in the secondary lever 22 of this example, a reinforcement rib 22m for connecting the upper wall of the secondary lever 22 and the end wall 22d of the insertion coupling portion 22b is formed at a position corresponding to the other thin hole 23h, so that the rigidity of the corresponding portion of the secondary lever 22 is increased.

In the further example (see FIG. 6) described above, the distal end support wall 22l is added while leaving the support wall 22j of the above embodiment. However, a structure in which the support wall 22j (and the support holes 23f, 24f) is omitted may be employed, in which the reinforcement rib 22m serves as the width direction support portion.

As in the further example (see FIG. 6) described above, the distal end support wall 22l is arranged at the end wall 22d of the insertion coupling portion 22b (insertion tube portion 22e), so that the rigidity of the insertion coupling portion 22b (insertion tube portion 22e), in particular, is enhanced. In particular, if molten resin flowing from the right side of FIG. 6(c), for example, merges at the end wall 22d at the left side of the insertion tube portion 22e when manufacturing of the secondary lever 22, a weld may form at the end wall 22d and may easily break the end wall 22d. However, the breakage of such portion is reduced by the distal end support wall 22l. The distal end support wall 22l of this example is used as the width direction support portion for reducing loosening and may be formed simply for the purpose of reducing the breakage (as a rigidity assisting portion that does not contact the inner surface of the thin hole 23g).

In the above embodiment, the longitudinally central portion of the two opposing side walls 22c is formed to be thinner than the longitudinal ends, but there is no such limitation, and the thickness of the two opposing side walls 22c may be set to be even, for example.

Figure 7:
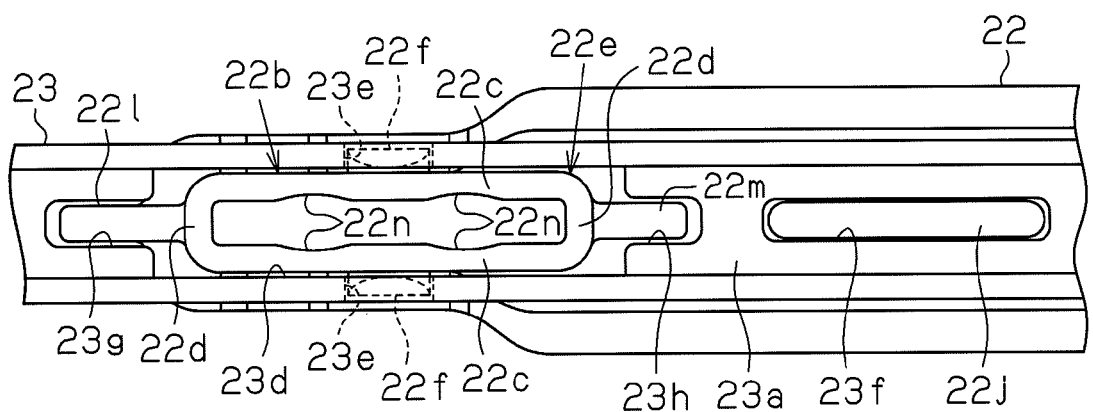
FIG. 7 is a partially enlarged bottom view of a wiper lever assembly according to another example.

For example, changes may be made as shown in FIG. 7. In this example (see FIG. 7), the shape of the opposing side wall 22c of the further example (see FIG. 6) is changed, and a thin portion 22n that is thinner than other portions is formed on both outer sides of the pivot coupling shaft portion 22f in the two opposing side walls 22c as viewed from the vertical direction (lower side). Specifically, the thin portion 22n of this example is formed at positions on both outer sides shifted from the range of the pivot coupling shaft portion 22f in the longitudinal direction of the opposing side wall 22c as viewed from the vertical direction (lower side), and includes the range of one thin portion 22n, the range of the pivot coupling shaft portion 22f, and the range of the other thin portion 22n continuous in the longitudinal direction. Furthermore, the thin portion 22n of this example is formed to be thin with the inner surface side (opposing side) of the two opposing side walls 22c formed to be gradually recessed (deeper toward the middle in the longitudinal direction).

Therefore, the portion of the thin portion 22n may be easily deformed with a small force, and the deformation amount (deformation margin), that is, the amount the pivot coupling shaft portion 22f moves to the side opposite to the projecting direction may be increased. Thus, for example, the assembling is facilitated. For example, if the thickness of the longitudinally central portion corresponding to the pivot coupling shaft portion 22f in the opposing side wall 22c is thin (e.g., the above described embodiment (see FIG. 5(c)) and the further example (see FIG. 6(c))), the stress concentrates at the longitudinally central portion. However, the stress can be dispersed compared to such a case, and furthermore, a structure in which breakage is less likely to occur and easy deformation is realized can be obtained.

In the above embodiment, the deformation restriction plate-like portion 25b for restricting the deformation of the two opposing side walls 22c is fitted and inserted into the insertion tube portion 22e of the insertion coupling portion 22b. However, there is no such limitation, and the deformation restriction plate-like portion 25b does not have to be fitted and inserted in such a manner. Furthermore, in the above embodiment, the deformation restriction plate-like portion 25b (deformation restriction member) is formed in the case 25, but the deformation restriction member for restricting the deformation by being fitted and inserted may be formed as a member separated from the case 25. In the above embodiment, the deformation restriction plate-like portion 25b is fitted and inserted into the insertion tube portion 22e so that the distal end is arranged in the vertical range of the pivot coupling shaft portion 22f. However, there is no such limitation, and may be only fitted and inserted where the distal end does not reach the vertical range of the pivot coupling shaft portion 22f. Furthermore, in the embodiment, the deformation restriction plate-like portion 25b is fitted and inserted into the insertion tube portion 22e so as to be arranged in all the ranges in the vertical range of the pivot coupling shaft portion 22f. However, there is no such limitation, and may be fitted and inserted only to a position in the middle of the vertical range of the pivot coupling shaft portion 22f.

In the above embodiment, the arcuate support portion 22h is formed in the secondary lever 22. However, there is no such limitation, and the arcuate support portion 22h may not be formed. In this case, for example, it is desirable that the inclined surface 22g not be formed in the pivot coupling shaft portion 22f. Therefore, improvement in the coupling performance by the inclined surface 22g is not obtained but the force (reaction force from the yoke lever relative to the pushing force toward the wiping surface) can be received at the pivot coupling shaft portion.

In the above embodiment, the insertion tube portion 22e has a substantially rectangular tube shape that is elongated in the longitudinal direction including the two opposing side walls 22c and the two end walls 22d, and the hole surrounded by the opposing side walls 22c and the end walls 22d extends through the upper wall at two longitudinal ends of the secondary lever 22. However, there is no such limitation, and the hole merely needs to be formed at least in the insertion tube portion 22e in the insertion coupling portion 22b, and the upper wall portion of two longitudinal ends of the secondary lever 22 may be closed, for example. Furthermore, the insertion tube portion 22e merely needs to be presented at one section of the insertion coupling portion 22b, and for example, a slit may be formed at one section in the lower end side of the end wall 22d of the insertion coupling portion 22b.

In the above embodiment, the pivot coupling holes 23e, 24e serving as the pivot coupled portion are formed as substantially circular open holes in which the periphery is closed. However, there is no such limitation, holes merely need to cooperatively operate with the pivot coupling shaft portion 22f serving as the pivot coupling portion for engagement permitting pivoting while preventing the separation of the yoke lever 23 (24) and the secondary lever 22. For example, the hole may be a slit open to the lower edge of the side wall of the yoke levers 23 and 24 or a recess in which the side walls of the yoke levers 23 and 24 are formed to project outward in the width direction so that the inner surface is hollow.

In the above embodiment, the pivot range setting projection 22i is formed in the secondary lever 22. However, there is no such limitation, and the pivot range setting projection 22i may be arranged at the side of the yoke levers 23, 24. Alternatively, the pivot range setting projection 22i may be omitted.

In the above embodiment, the secondary lever 22 is made of resin and the yoke levers 23, 24 are made of metal. This may be changed so that they are respectively made from a different material.

In the above embodiment, the center cover lever 21 and the case 25 include the fin portions 21a, 25a, respectively. However, there is no such limitation, and the fin portions 21a, 25a may be omitted.

In the above embodiment, the present invention is applied to the coupling portion of the secondary lever 22 and the yoke levers 23, 24. However, there is no such limitation, and the present invention may be applied to the coupling portion of the uppermost rank lever (center cover lever 21 in the present embodiment) of the lever assembly and a lower rank lever (secondary lever 22 in the present embodiment) of the lever assembly.

In the above embodiment, the present invention is embodied in the wiper lever assembly 11 (wiper 1) having a whippletree configuration that pivotally couples the longitudinally central portion of a lower rank lever to a longitudinal end of an upper rank lever. However, there is no such limitation, and the present invention may be embodied in a different type of wiper configured by arranging a plurality of levers including a first lever and a second lever and pivotally couples the levers.

Figure 8:
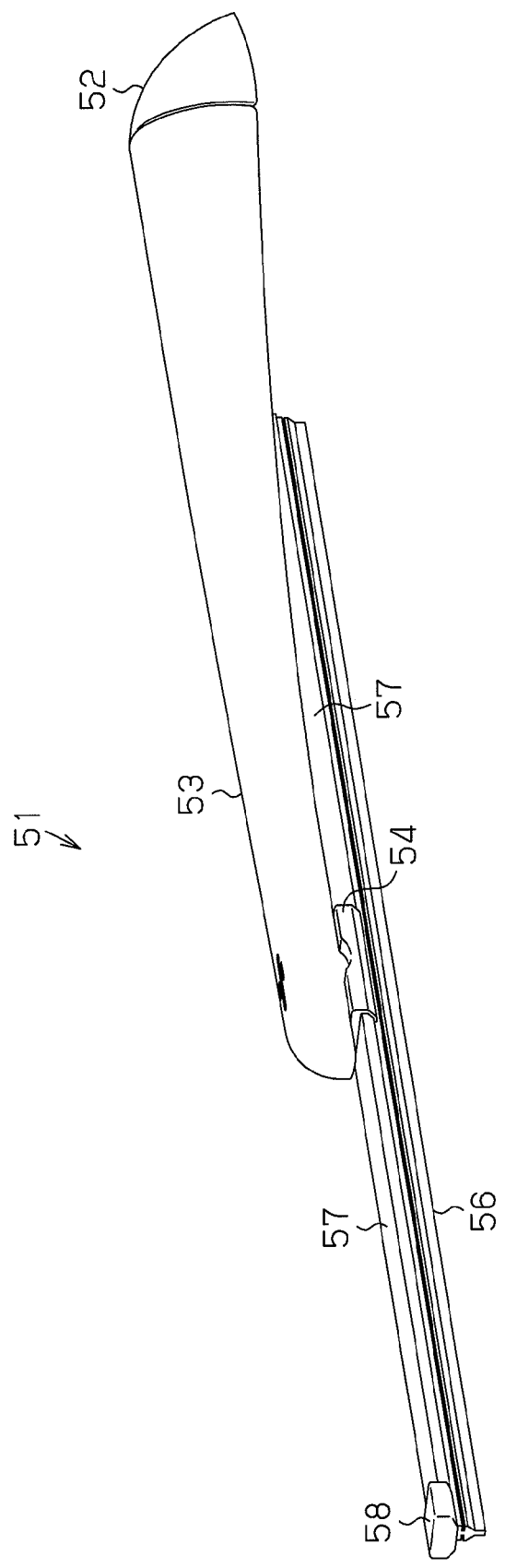
FIG. 8 is a perspective view of a wiper for a vehicle according to another example.

For example, the present invention may be embodied in a wiper 51 shown in FIG. 8. The wiper 51 of this example (see FIG. 8 to FIG. 11) wipes off rain and the like from a rear window. The wiper 51 includes an arm head 52, an arm lever 53, which is an upper rank lever serving as the first lever, a pivot lever 54 (see FIG. 9), which is a lower rank lever serving as a second lever, a backing 55 (see FIG. 11(b)), a wiper strip 56, a holding case 57, and a cap 58.

The arm lever 53 coupled to the arm head 52 is made of resin and has a substantially reverse U-shape cross-section orthogonal to the longitudinal direction. A pivot lever 54 is pivotally coupled to the distal end of the arm lever 53.

Figure 9:
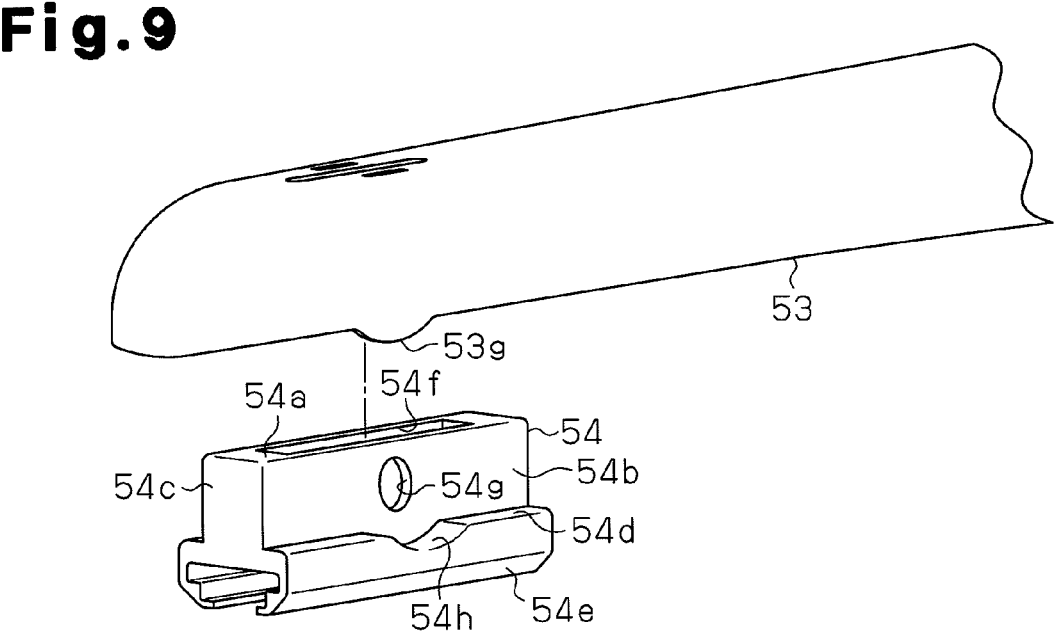
FIG. 9 is a partially exploded perspective view of a wiper for a vehicle according to another example.
Figure 10A:
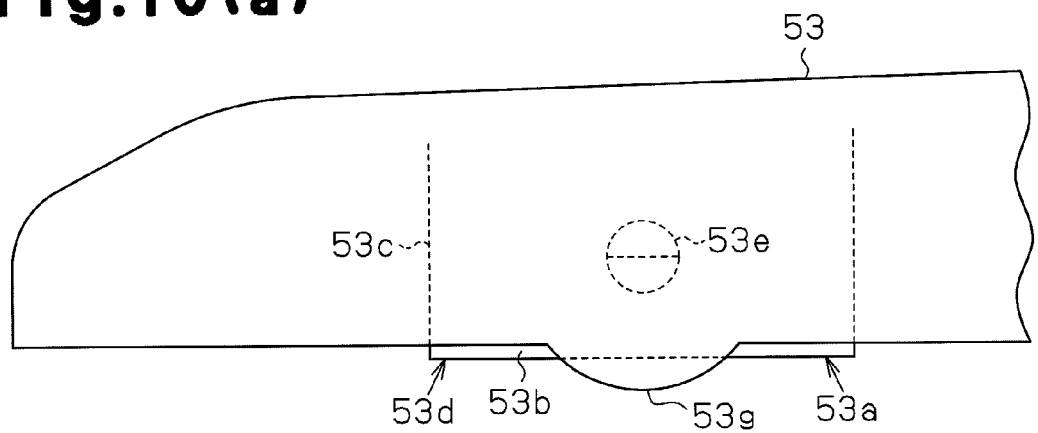
FIG. 10(a) is a partially enlarged side view of an arm lever according to another example.

In detail, first, the pivot lever 54 is made of metal, and includes an upper wall 54a serving as a coupled end, two side walls 54b downwardly extending from both sides in the width direction orthogonal to the longitudinal direction of the upper wall 54a, and two longitudinal end walls 54c downwardly extending from the longitudinal ends of the upper wall 54a to form a tubular shape with the side walls 54b, as shown in FIG. 9. The pivot lever 54 includes an outer extending portion 54d extending from the lower end of the side wall 54b to the outer side in the width direction, and a holding portion 54e extending from the distal end of the outer extending portion 54d to hold the longitudinally central portion of the backing 55 and the wiper strip 56. An elongated hole 54f, which is elongated in the longitudinal direction as viewed from the vertical direction, is formed in the longitudinally central portion of the upper wall 54a. A pivot coupling hole 54g is formed in a longitudinally central portion of the side wall 54b.

As shown in FIGS. 10(a), 10(b), 11(a), and 11(b), the distal end of the arm lever 53 includes an insertion coupling portion 53a downwardly extending from the inner side of the upper wall of the arm lever 53 to be inserted and coupled to the elongated hole 54f from the upper side.

Figure 10B:
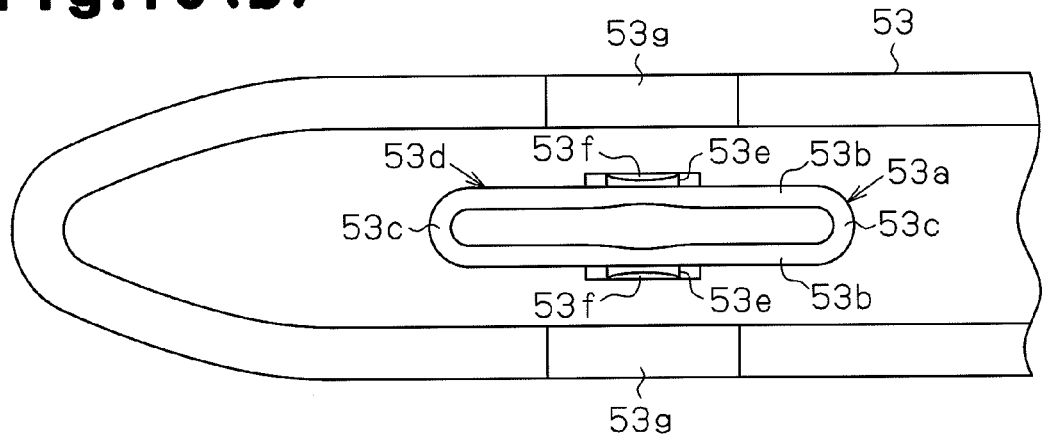
FIG. 10(b) is a partially enlarged bottom view of the arm lever according to another example.
Figure 11:
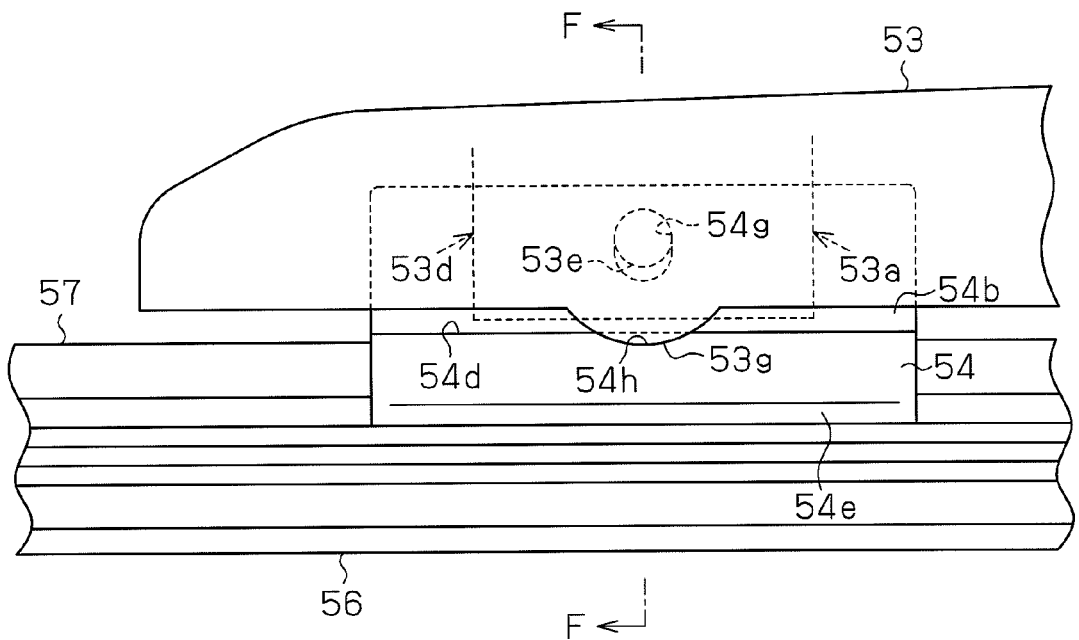
FIG. 11(a) is a partially enlarged side view of a wiper for a vehicle according to another example.
FIG. 11(b) is a cross-sectional view taken along line F-F in FIG. 11(a).
Figure 11:
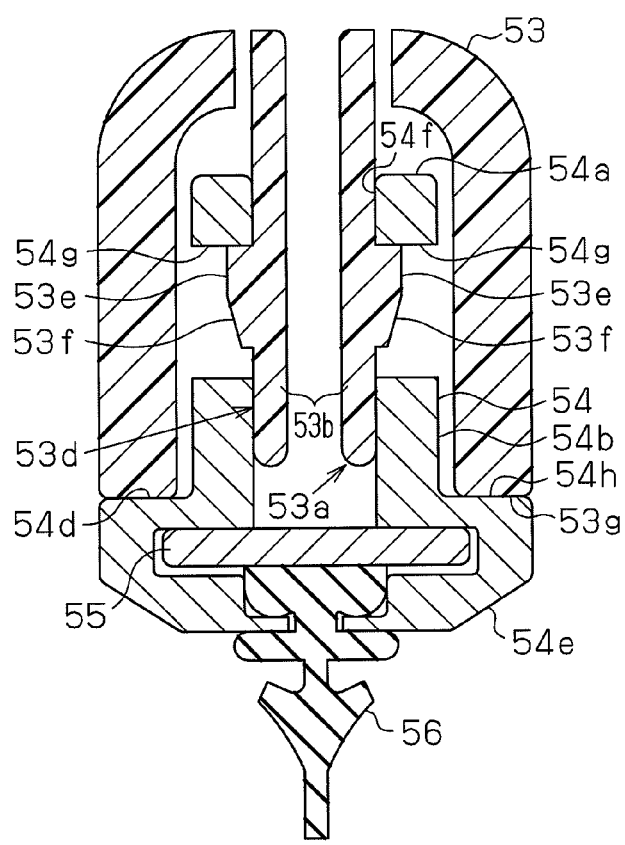

As shown in FIGS. 10(b) and 11(b), the insertion coupling portion 53a includes an insertion tube portion 53d having a substantially rectangular tube shape that includes two opposing side walls 53b extending in parallel so as to face the inner surfaces of the two side walls 54b and two end walls 53c connecting the longitudinal ends of the opposing side walls 53b. The insertion tube portion 53d is elongated in the longitudinal direction as viewed from the vertical direction (lower side) (see FIG. 10(b)). The insertion coupling portion 53a includes a pivot coupling shaft portion 53e that projects in the width direction from the longitudinally central portion of the two opposing side walls 53b to engages the pivot coupling hole 54g while permitting pivoting. The pivot coupling shaft portion 53e of the present embodiment is formed to have a circular shape as viewed from the axial direction, and includes an inclined surface 53f inclined so that the projecting amount in the lower half becomes smaller toward the lower side.

As shown in FIGS. 10(a) and 11(a), the arm lever 53 includes an arcuate support portion 53g having an arcuate shape, that is, an arcuate projecting shape substantially concentric with the pivot coupling shaft portion 53e located at the lower end of the side wall of the arm lever 53 at the lower side of the pivot coupling shaft portion 53e. The arcuate support portion 53g contacts an arcuate recessed surface 54h formed on the upper surface of the outer extending portion 54d of the pivot lever 54 to pivotally support the pivot lever 54 while applying pushing force from the arm lever 53 to the pivot lever 54.

As shown in FIG. 10(b), the longitudinally central portion of the two opposing side walls 53b is thinner than the longitudinal ends. The arm lever 53 and the pivot lever 54 configured in the above manner are coupled in a relatively pivotal manner, like the above embodiment, by inserting the insertion coupling portion 53a into the elongated hole 54f from the upper side.

When the arcuate support portion 53g of the arm lever 53 is in contact with the arcuate recessed surface 54h of the outer extending portion 54d of the pivot lever 54, the pivot coupling shaft portion 53e is shaped so as not to contact with the lower portion of the pivot coupling hole 54g in the pivot lever 54 (shape in which there is hardly any contacting surface making it difficult to downwardly transmit pushing force), the pushing force from the arm lever 53 is mainly applied from the arcuate support portion 53g, and the force from the pivot coupling shaft portion 53e is subtle.

The holding case 57 is attached to cover and hold the backing 55 and both sides in the longitudinal direction of the wiper strip 56. The longitudinally central portion is held by the holding portion 54e, and the cap 58 is further attached to the backing 55 and both ends of the wiper strip 56.

The wiper 51 may obtain the same advantages as the above embodiment.

In the above embodiment, the pivot lever 54 is made of metal but may be made of resin.

In the above embodiment, the first lever including the insertion coupling portion is the upper rank lever and the second lever including the elongated hole to which the insertion coupling portion is to be inserted is the lower rank lever. However, the first lever including the insertion coupling portion may be the lower rank lever, and the second lever including the elongated hole to which the insertion coupling portion is to be inserted may be the upper rank lever.

DESCRIPTION OF REFERENCE CHARACTERS

11: wiper lever assembly
12, 55: backing
13, 56: wiper strip
22: secondary lever (first lever)
22b, 53a: insertion coupling portion
22c, 53b: opposing side wall
22d, 53c: end wall
22e, 53d: insertion tube portion
22f, 53e: pivot coupling shaft portion (pivot coupling portion)
22h, 53g: arcuate support portion
22i: pivot range setting projection
22j: support wall (width direction support portion)
22n: thin portion
23, 24: yoke lever (second lever)
23a, 24a, 54a: upper wall (coupled end)
23b, 24b, 54b: side wall
23c, 24c, 54e: holding portion
23d, 24d, 54f: elongated hole
23e, 24e, 54g: pivot coupling hole (pivot coupled portion)
25: case
25b: deformation restriction plate-like portion (deformation restriction member and deformation restriction portion)
53: arm lever (first lever)
54: pivot lever (second lever)

The invention claimed is:

1. A wiper configured by pivotally coupling a plurality of levers, the wiper comprising:
   a second lever including a coupled end and two side walls, wherein the coupled end extends along a longitudinal direction and includes two sides in a width direction orthogonal to the longitudinal direction, the two side walls include inner surfaces facing each other and respectively extending from the two sides toward a first side in a vertical direction, the coupled end includes a coupling portion, the coupling portion includes an elongated hole extending in the longitudinal direction as viewed from the vertical direction, and each of the side walls includes a pivot coupled portion; and
   a first lever including an insertion coupling portion extending toward the first side in the vertical direction, wherein the insertion coupling portion is inserted into the elongated hole from a second side in the vertical direction and coupled to the elongated hole,
   wherein the insertion coupling portion includes an insertion tube portion and a pivot coupling portion, the insertion tube portion includes two opposing side walls, respectively facing the inner surfaces, and two end walls, connecting longitudinal ends of the opposing side walls, the insertion tube portion has a substantially rectangular tube shape elongated in the longitudinal direction as viewed from the vertical direction, and the pivot coupling portion projects from a longitudinally central portion of each of the opposing side walls to pivotally engage with the corresponding pivot coupled portion, and
   wherein a deformation restriction member is fitted and inserted into the insertion tube portion of the insertion coupling portion to restrict deformation of the two opposing side walls when the insertion coupling portion is inserted and coupled to the elongated hole.

2. The wiper according to claim 1, wherein a thin portion formed to be thin is formed on two outer sides of the pivot coupling portion in each of the opposing side walls as viewed from the vertical direction.

3. The wiper according to claim 1, wherein the deformation restriction member is arranged in a case attached to cover at least one of the first lever and the second lever.

4. The wiper according to claim 3, wherein the case includes a fin portion that converts travel wind when a vehicle is travelling to a pushing force acting toward a wiping surface.

5. The wiper according to claim 1 wherein the deformation restriction member is fitted and inserted into the insertion tube portion so that at least a part of the deformation restriction member is arranged in a vertical range corresponding to the pivot coupling portion.

6. The wiper according to claim 1, wherein the one among the first lever and the second lever that is an upper rank lever includes an arcuate support portion, wherein the arcuate support portion is formed to have an arcuate shape and located above or below the pivot coupling portion, and the arcuate support portion pivotally supports the one among the first lever and the second lever that is a lower rank lever, while applying pushing force from the upper rank lever to the lower rank lever.

7. The wiper according to claim 1,
wherein the pivot coupling portion has a pivot axis, and
wherein a width direction support portion is arranged in the first lever at a position where a distance from the pivot axis is farther than a longitudinal end of the opposing side wall to reduce loosening in the width direction of the second lever relative to the first lever, wherein the width direction support portion faces in the width direction to be engageable with the second lever.

8. The wiper according to claim 1, wherein one of the first lever and the second lever includes a pivot range setting projection that contacts the other one of the levers and limits a pivot range of the second lever relative to the first lever to a range set in advance.

9. The wiper according to claim 1, wherein
the first lever is an upper rank lever and is made of a resin; and
the second lever is a lower rank lever made of a metal and including a holding portion that holds a backing and a wiper strip.

10. The wiper according to claim 1, wherein a dimension from an upper edge of the insertion coupling portion to the pivot coupling portion is smaller than a dimension from the end wall of the insertion tube portion to the pivot coupling portion.

11. A wiper lever assembly comprising the wiper according to claim 1, wherein
the wiper lever assembly, includes a plurality of levers in addition to the first lever and the second lever.

12. A wiper blade comprising:
the wiper lever assembly according to claim 11; and
a backing and a wiper strip held by the wiper lever assembly.

13. A wiper configured by pivotally coupling a plurality of levers, the wiper comprising:
a second lever including a coupled end and two side walls, wherein the coupled end extends along a longitudinal direction and includes two sides in a width direction orthogonal to the longitudinal direction, the two side walls include inner surfaces facing each other and respectively extending from the two sides toward a first side in a vertical direction, the coupled end includes a coupling portion, the coupling portion includes an elongated hole extending in the longitudinal direction as viewed from the vertical direction, and each of the side walls includes a pivot coupled portion; and
a first lever including an insertion coupling portion extending toward the first side in the vertical direction, wherein the insertion coupling portion is inserted into the elongated hole from a second side in the vertical direction and coupled to the elongated hole,
wherein the insertion coupling portion includes an insertion tube portion and a pivot coupling portion, the insertion tube portion includes two opposing side walls, respectively facing the inner surfaces, and two end walls, connecting longitudinal ends of the opposing side walls, the insertion tube portion has a substantially rectangular tube shape elongated in the longitudinal direction as viewed from the vertical direction, and the pivot coupling portion projects from a longitudinally central portion of each of the opposing side walls to pivotally engage with the corresponding pivot coupled portion, and
wherein the one among the first lever and the second lever that is an upper rank lever includes an arcuate support portion, wherein the arcuate support portion is formed to have an arcuate shape and located above or below the pivot coupling portion, and the arcuate support portion pivotally supports the one among the first lever and the second lever that is a lower rank lever, while applying pushing force from the upper rank lever to the lower rank lever.

* * * * *